US010145328B2

(12) United States Patent
Ohori et al.

(10) Patent No.: US 10,145,328 B2
(45) Date of Patent: Dec. 4, 2018

(54) MOTOR VEHICLE

(71) Applicant: TOYOTA JIDOSHA KABUSHIKI KAISHA, Toyota-shi, Aichi-ken (JP)

(72) Inventors: Shinya Ohori, Toyota (JP); Junji Hyodo, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/835,668

(22) Filed: Dec. 8, 2017

(65) Prior Publication Data

US 2018/0163661 A1   Jun. 14, 2018

(30) Foreign Application Priority Data

Dec. 13, 2016   (JP) .................. 2016-241419

(51) Int. Cl.
| | | |
|---|---|---|
| *F02D 41/38* | (2006.01) | |
| *F02D 41/22* | (2006.01) | |
| *B60W 10/06* | (2006.01) | |
| *F02D 41/06* | (2006.01) | |
| *F02D 45/00* | (2006.01) | |
| *B60W 50/02* | (2012.01) | |

(52) U.S. Cl.
CPC ......... *F02D 41/3845* (2013.01); *B60W 10/06* (2013.01); *F02D 41/06* (2013.01); *F02D 41/22* (2013.01); *F02D 41/222* (2013.01); *F02D 41/38* (2013.01); *F02D 45/00* (2013.01); *B60W 2050/021* (2013.01); *F02D 2041/223* (2013.01); *F02D 2041/224* (2013.01); *F02D 2200/0602* (2013.01); *F02D 2200/0606* (2013.01)

(58) Field of Classification Search
CPC ...... F02D 41/3845; F02D 41/38; F02D 41/22; F02D 41/06; F02D 45/00; F02D 41/222; F02D 2041/223; F02D 2200/0602; F02D 2200/0606; F02D 2041/224; B60W 10/06; B60W 2050/021
See application file for complete search history.

(56) References Cited

U.S. PATENT DOCUMENTS

2015/0184610 A1* 7/2015 Onozawa ............. F02D 41/222
123/294

FOREIGN PATENT DOCUMENTS

| JP | 2015-124742 | 7/2015 |
|---|---|---|
| JP | 2015-132171 | 7/2015 |

* cited by examiner

*Primary Examiner* — Hung Q Nguyen
*Assistant Examiner* — Xiao Mo
(74) *Attorney, Agent, or Firm* — Finnegan, Henderson, Farabow, Garrett & Dunner, LLP

(57) ABSTRACT

After a system-off state has continued for a preset, time period since a system-off operation, on satisfaction of abnormality diagnosis prerequisites including a condition that a warm-up determination parameter indicating a degree of warm-up of an engine at a system-off time is equal to or greater than a predetermined value, characteristic abnormality diagnosis is performed to determine whether a characteristic abnormality occurs in a fuel pressure sensor. For a time period from a system-on operation to a system-off operation, the warm-up determination parameter is incremented when the engine is in operation, while being decremented after satisfaction of a predetermined condition when the engine is not in operation.

7 Claims, 7 Drawing Sheets

MOTOR VEHICLE

CROSS-REFERENCE TO RELATED APPLICATIONS

The present disclosure claims priority to Japanese Patent Application No. 2016-241419 filed Dec. 13, 2016, which is incorporated herein by reference in its entirety including specification, drawings and claims.

TECHNICAL FIELD

The present disclosure relates to a motor vehicle and more specifically relates to a motor vehicle that includes an engine including an in-cylinder injection valve configured to inject a fuel in a cylinder.

BACKGROUND

A proposed configuration of a motor vehicle includes an engine equipped with an in-cylinder injection valve that, is configured to inject a fuel in a cylinder, and performs abnormality diagnosis of a fuel pressure sensor in the case where a soak time exceeds a set key-off time at the time of a key switch on-operation (as described in, for example, JP 2015-124742A). In this motor vehicle, a condition that a total intake air amount, indicating an engine temperature immediately before a key switch off-operation exceeds a set intake air amount indicating a full warm-up determination temperature, as well as the condition that the soak time exceeds the set key-off time, is added as a condition of diagnosis of the fuel pressure sensor. This configuration enables abnormality diagnosis of the fuel pressure sensor to be performed even in a relatively short soak time, when the fuel in a fuel rail is heated by radiant heat after a atop of the engine to have an increased pressure and the fuel pressure is decreased to a low pressure by opening a relief valve for leakage.

SUMMARY

In the motor vehicle described above, however, even when the total intake air amount exceeds the set intake air amount indicating the full warm-up determination temperature prior to the key switch off-operation, the temperature of a fuel supply pipe may not be a sufficient temperature immediately before the key switch off-operation, in some state of the vehicle. A hybrid vehicle intermittently operates the engine. Driving the hybrid vehicle with stopping operation of the engine causes the engine and the fuel supply pipe to be cooled by the running wind. In a motor vehicle with idling stop function, the engine and the fuel supply pipe are cooled at a stop of the engine by the idling stop function. In such cases, even when the total intake air amount exceeds the set intake air amount, the temperature of the engine or the temperature of the fuel supply pipe may be lower than the full warm-up determination temperature. This causes inappropriate abnormality diagnosis of the fuel pressure sensor.

A motor vehicle of the present disclosure mainly aims to appropriately perform abnormality diagnosis of a fuel pressure sensor placed in a supply flow path that is configured to supply a fuel to an in-cylinder injection valve.

In order to achieve the above primary object, the motor vehicle of the present disclosure employs the following configuration.

The present disclosure is directed to a motor vehicle. The motor vehicle includes an engine including an in-cylinder injection valve configured to inject a fuel in a cylinder, a fuel supply device including a high-pressure fuel pump configured to pressurize the fuel from a fuel tank and supply the pressurized fuel to a supply flow path that is connected with the in-cylinder injection valve, a fuel pressure sensor configured to detect, a pressure of the fuel in the supply flow path, and a control device configured to control the engine and the fuel supply device and to perform characteristic abnormality diagnosis that determines whether a characteristic abnormality occurs in the fuel pressure sensor, on satisfaction of abnormality diagnosis prerequisites that include a condition that, a warm-up determination parameter indicating a degree of warm-up of the engine at a system-off time is equal to or greater than a predetermined value, after a system-off state has continued for a preset time period since a system-off operation. For a time period from a system-on operation to a system-off operation, the control device increments the warm-up determination parameter when the engine is in operation, while decrementing the warm-up determination parameter after satisfaction of a predetermined condition when the engine is not in operation.

After the system-off state has continued for the preset time period since the system-off operation, on satisfaction of the abnormality diagnosis prerequisites including one condition that the warm-up determination parameter indicating the degree of warm-up of the engine at the system-off time is equal to or greater than the predetermined value, the motor vehicle of this aspect performs characteristic abnormality diagnosis to determine whether a characteristic abnormality occurs in the fuel pressure sensor. In this configuration, for the time period from the system-on operation to the system-off operation, the warm-up determination parameter is incremented when the engine is in operation, while being decremented after satisfaction of the predetermined condition when the engine is not in operation. The configuration of decrementing the warm-up determination parameter after satisfaction of the predetermined condition when the engine is not in operation enables the temperature of the engine and the temperature of the supply flow path of the fuel to be more appropriately reflected on the warm-up determination parameter. As a result, this configuration ensures the more appropriate characteristic abnormality diagnosis of the fuel pressure sensor.

The warm-up determination parameter used may be, for example, a parameter based on integration of an operation time of the engine or a parameter based on integration of an intake air amount of the engine. An integrated value of the operation time of the engine may be used as the parameter based on integration of the operation time of the engine. An integrated value of the intake air amount of the engine may be used as the parameter based on integration of the intake air amount of the engine.

The warm-up determination parameter is decremented by a decrement value that may be a predetermined value or that may increase with a decrease in ambient temperature or increase with an increase in vehicle speed. This is based on that the lower ambient temperature is likely to more readily cool the engine and the supply flow path of the fuel and that the higher-vehicle speed is likely to more readily cool the engine and the supply flow path of the fuel. The configuration of using the larger value of the warm-up determination parameter for the lower ambient temperature or using the larger value of the warm-up determination parameter for the higher vehicle speed enables the temperature of the engine and the temperature of the supply flow path of the fuel to be more appropriately reflected on the warm-up determination parameter. As a result, this configuration ensures the more appropriate characteristic abnormality diagnosis of the fuel pressure sensor.

The predetermined condition used may be a condition that a predetermined time period has elapsed since a stop of the engine. This is because the engine and the supply flow path of the fuel are affected by radiant heat of the engine for some time period after a stop of the engine. Decrementing the warm-up determination parameter in this time period causes a failure to reflect the temperature of the engine and the temperature of the supply flow path of the fuel more appropriately on the warm-up determination parameter. In this configuration, the predetermined time period may be a shorter time period at the lower ambient temperature or may be a shorter time period at the higher vehicle speed. This is based on that the lower ambient temperature is likely to more readily cool the engine and the supply flow path of the fuel and that the higher vehicle speed is likely to more readily cool the engine and the supply flow path of the fuel.

DESCRIPTION OF EMBODIMENTS

The following describes some aspects of the disclosure with reference to embodiments.

Figure 1:
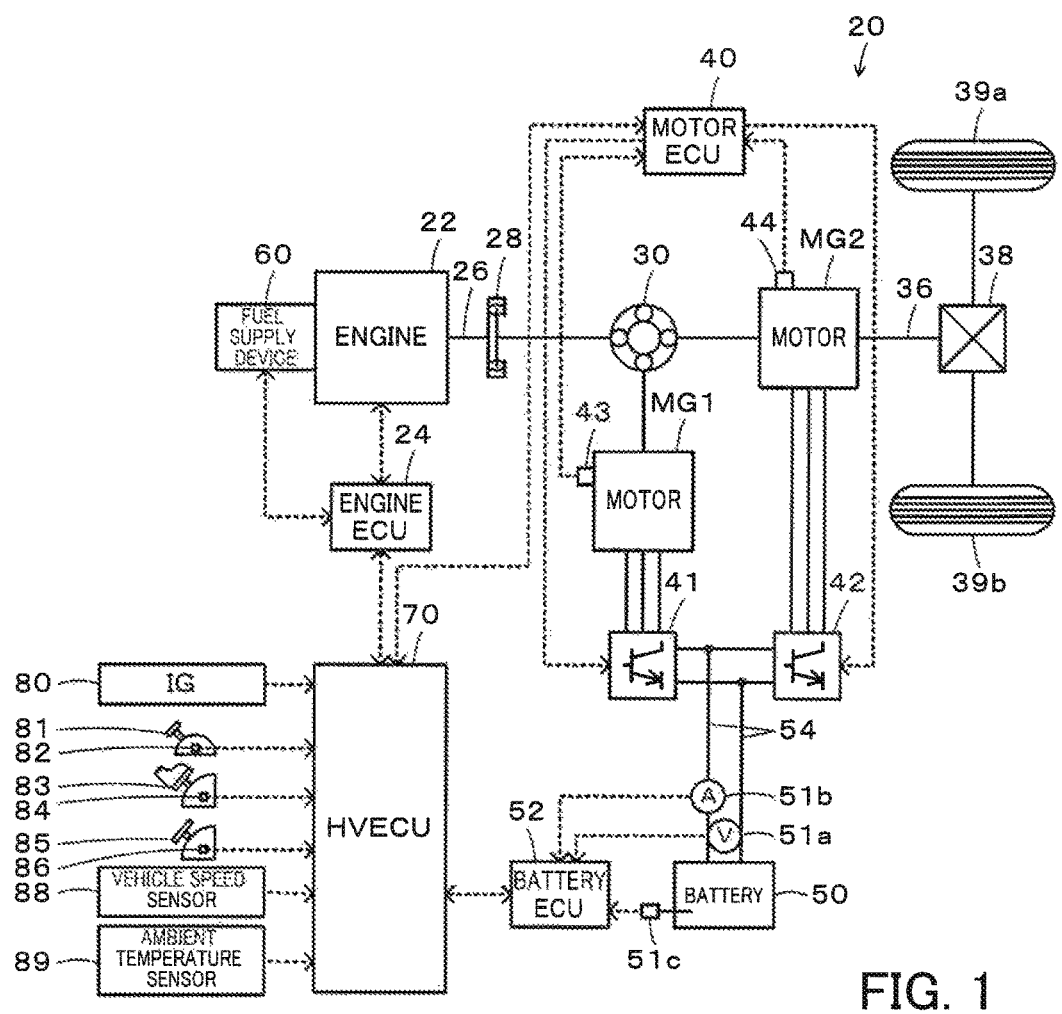
FIG. 1 is a configuration diagram illustrating the schematic configuration of a hybrid vehicle.
Figure 2:
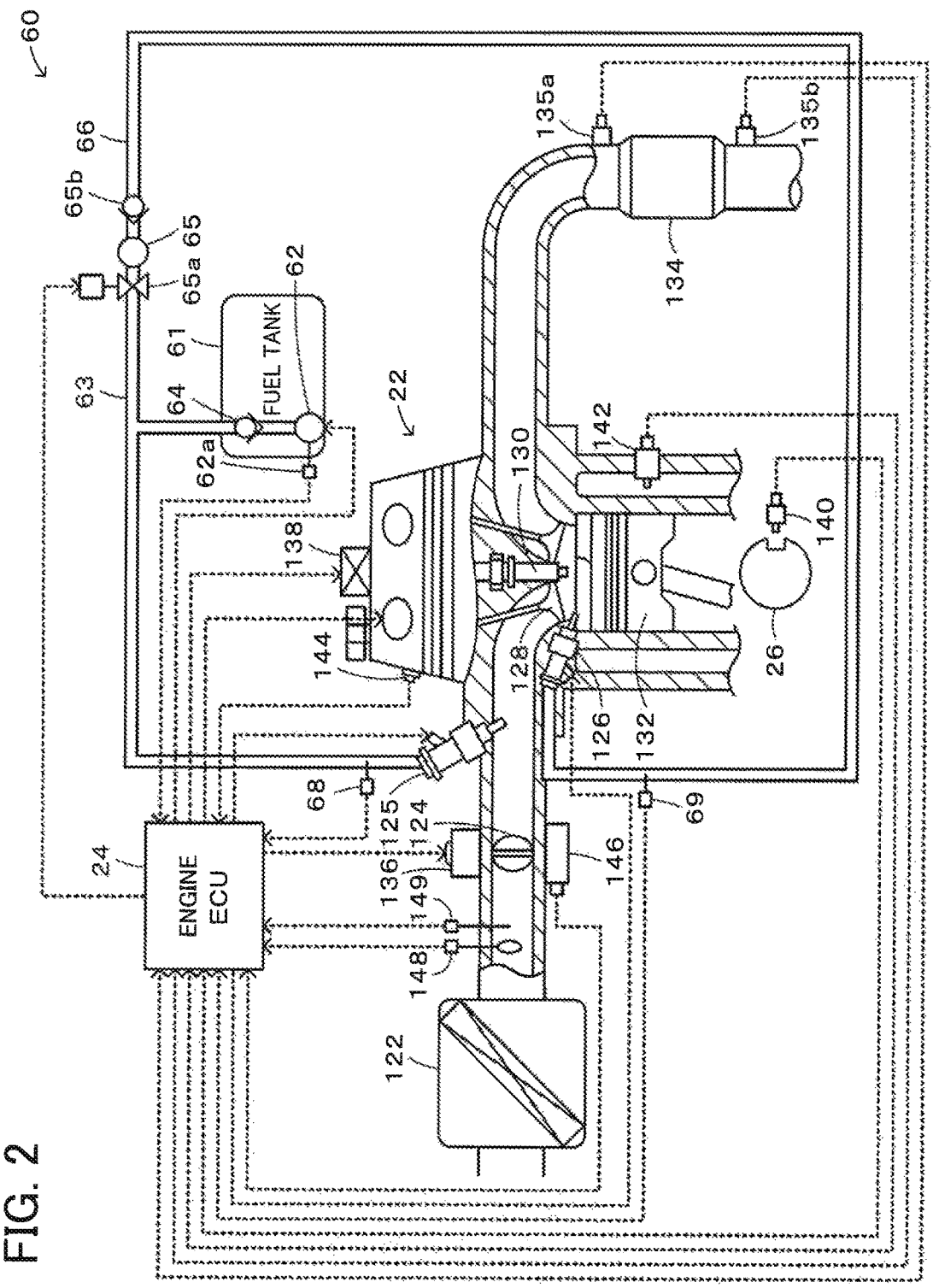
FIG. 2 is a configuration diagram illustrating the schematic configuration of an engine and a fuel supply device.

FIG. 1 is a configuration diagram illustrating the schematic configuration of a hybrid vehicle 20 according to an embodiment of the present disclosure. FIG. 2 is a configuration diagram illustrating the schematic configuration of an engine 22 and a fuel supply device 60. As shown in FIG. 1, the hybrid vehicle of the embodiment includes an engine 22, a fuel supply device 60, a planetary gear 30, motors MG1 and MG2, inverters 41 and 42, a battery 50, and a hybrid electronic control unit (hereinafter referred as "HVECU") 70.

The engine 22 is configured as an internal combustion engine that outputs power using a fuel such as gasoline or light oil. As shown in FIG. 2, the engine 22 includes a port injection valve 125 configured to inject the fuel into an air intake port and an in-cylinder injection valve 126 configured to inject the fuel in a cylinder. The engine 22 equipped with the port injection valve 125 and the in-cylinder injection valve 126 may be operated in any of a port injection mode, an in-cylinder injection mode and a shared injection mode. In the port injection mode, the air cleaned by an air cleaner 122 and taken in via a throttle valve 124 is mixed with the fuel injected from the port injection valve 125. This air-fuel mixture is taken via an air intake valve 128 into a combustion chamber and is explosively combusted with an electric spark by a spark plug 130. The reciprocating motion of a piston 132 pressed down by the energy of the explosive combustion is converted into the rotational motion of a crankshaft 26. In the in-cylinder injection mode, the air is taken into the combustion chamber as in the port injection mode, and the fuel is injected, from the in-cylinder injection valve 126 in the middle of an intake stroke or after the start of a compression stroke. The air-fuel mixture is then explosively combusted with an electric spark by the spark plug 130 to provide the rotational motion of the crankshaft 26. In the shared injection mode, the fuel is injected from the port injection valve 125 during intake of the air into the combustion chamber and is also injected from the in-cylinder injection valve 126 in the intake stroke or in the compression stroke. The air-fuel mixture is then explosively combusted with an electric spark by the spark plug 130 to provide the rotational motion of the crankshaft 26. The injection mode is changed over among these injection modes, based on the operating conditions of the engine 22. The exhaust emission from the combustion chamber is discharged to the outside air via a catalytic converter 134 that is filled with a conversion catalyst (three-way catalyst) serving to convert toxic components such as carbon monoxide (CO), hydrocarbons (HC) and nitrogen oxides (NOx).

As shown in FIG. 2, the fuel supply device 60 is configured as a device to supply the fuel to the port injection valve 125 and the in-cylinder injection valve 126 of the engine 22. The fuel supply device 60 includes a fuel tank 61, a feed pump (first pump) 62 configured to supply the fuel in the fuel tank 61 to a low pressure-side passage (first passage) 63 connected with the port injection valve 125, a check valve 64 provided in the low pressure-side passage 63, and a high-pressure fuel pump (second pump) 65 configured to pressurize the fuel on the port injection valve 125-side of the check valve 64 in the low pressure-side passage 63 and supply the pressurised fuel to a high pressure-side passage (second passage) 66 connected with the in-cylinder injection valve 126.

The feed pump 62 and the check valve 64 are placed in the fuel tank 61. The feed pump 62 is configured as a power-driven pump that is operated with supply of electric power from the battery 50. The check valve 64 is opened when the fuel pressure (pressure of the fuel) on the feed pump 62-side is higher than the fuel pressure on the port injection valve 125-side in the low pressure-side passage 63, while being closed when the fuel pressure on the feed pump 62-side is equal to or lower than the fuel pressure on the port injection valve 125-side.

The high-pressure fuel pump 65 is provided as a pump that is driven by the power from the engine 22 (rotation of a cam shaft) to pressurize the fuel in the low pressure-side passage 63. The high-pressure fuel pump 65 includes a electromagnetic valve 65a that is connected with an inlet thereof and is opened and closed to pressurize the fuel, and a check valve 65b that is connected with an outlet thereof and serves to prevent the back flow of the fuel and keep the fuel pressure in the high pressure-side passage 66. When the electromagnetic valve 65a is opened during operation of the engine 22, this high-pressure fuel pump 65 serves to take in the fuel from the feed pump 62. When the electromagnetic valve 65a is closed, the high-pressure fuel pump 65 serves to intermittently feed the fuel that is compressed by a plunger (not shown) operated by the power from the engine 22, via the check valve 65b to the high pressure-side passage 66 and thereby pressurize the fuel that is to be supplied to the high pressure-side passage 66. While the high-pressure fuel pump 65 is driven, the fuel pressure in the low pressure-side passage 63 or the fuel pressure in the high pressure-side passage 66 pulsates according to the rotation of the engine 22 (rotation of the cam shaft).

The engine 22 and the fuel supply device 60 are subjected to operation control by an engine electronic control unit (hereinafter referred to as "engine ECU") 24. The engine ECU 24 is configured as a CPU-based, microprocessor and includes a ROM configured to store processing programs, a RAM configured to temporarily store data, input/output ports and a communication port, in addition to the CPU, although not being illustrated.

Signals from various sensors required for operation control of the engine 22 and control of the fuel supply device 60 are input into the engine ECU 24 via the input port. The signals input into the engine ECU 24 include, for example, a crank position θcr from a crank position sensor 140 configured to detect the rotational position of the crankshaft 26 and a cooling water temperature Tw from a water temperature sensor 142 configured to detect the temperature of cooling water of the engine 22. The input signals also include a cam position θca from a cam position sensor 144 configured to detect the rotational position of an intake cam shaft serving to open and close the air intake valve 128 and to detect the rotational position of an exhaust cam shaft serving to open and close an exhaust valve. Additionally, the input signals include a throttle position TH from a throttle position sensor 146 configured, to detect the position of the throttle valve 124, an intake air amount Qa from an air flowmeter 148 mounted to an air intake pipe, and an intake air temperature Ta from a temperature sensor 149 mounted to the air intake pipe. Furthermore, the input, signals include an air-fuel ratio AF from an air-fuel ratio sensor 135a mounted to an exhaust pipe and an oxygen signal O2 from an oxygen sensor 135b mounted to the exhaust pipe. The input signals also include a rotation speed Nfp of the feed pump 62 from a rotation speed sensor 62a attached to the feed pump 62 of the fuel supply device 60, a fuel pressure Pfp of the fuel that is to be supplied to the port fuel valve 125, from a fuel pressure sensor 68 placed in the vicinity of the port injection valve 125 in the low pressure-side passage 63, and a fuel pressure Pfd of the fuel that is to be supplied to the in-cylinder injection valve 126, from a fuel pressure sensor 69 placed in the vicinity of the in-cylinder injection valve 126 in the high pressure-side passage 66.

Various control signals for operation control of the engine 22 and control of the fuel supply device 60 are output from the engine ECU 24 via the output port. The signals output from the engine ECU 24 include, for example, a driving signal to the port injection valve 125, a driving signal to the in-cylinder injection valve 126, a driving signal to a throttle motor 136 configured to adjust the position of the throttle valve 124 and a control signal to an ignition coil 138 integrated with an igniter. The output signals also include a drive control signal to the feed pump 62 and a drive control signal to the electromagnetic valve 65a of the high-pressure fuel pump 65.

The engine ECU 24 is connected with the EVECU 70 via the respective communication ports. The engine ECU 24 calculates a rotation speed Ne of the engine 22, based on the crank position θcr input, from the crank position sensor 140. The engine ECU 24 also calculates a volume efficiency KL (ratio of the volume of the air actually taken in one cycle to the stroke volume per cycle of the engine 22), based on the intake air amount Qa input from the air flow meter 148 and the rotation speed Ne of the engine 22.

As shown in FIG. 1, the planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 33a and 39b via a differential gear 38. The planetary gear 30 further includes a carrier that is connected with the crankshaft 26 of the engine 22 via a damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are respectively connected with the motors MG1 and MG2 and are also connected with the battery 50 via power lines 54. A motor electronic control unit (hereinafter referred to as "motor ECU") 40 performs switching control of a plurality of switching elements (not shown) included in the respective inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions θm1 and θm2 from rotational position detection sensors 43 and 44 configured to detect the rotational positions of the respective rotors of the motors MG1 and MG2 and a temperature tm2 of the motor MG2 from a temperature sensor configured to detect the temperature of the motor MG2, are input into the motor ECU 40 via the input port. The motor ECU 40 outputs via the output port, for example, switching control signals to the plurality of switching elements (not shown) included in the respective inverters 41 and 42. The motor ECU 40 is connected with the HVECU 70 via the respective communication ports. The motor ECU 40 calculates rotation speeds Nm1 and Nm2 of the motors MG1 and MG2, based on the rotational positions θm1 and θm2 of the respective rotors of the motors MG1 and MG2 input from the rotational position detection sensors 43 and 44.

The battery 50 is configured, for example, as a lithium ion secondary battery or a nickel metal, hydride secondary battery. This battery 50 is connected with the inverters 41 and 42 via the power lines 54. The battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a battery voltage Vb from a voltage sensor 51a placed between terminals of the battery 50, a battery current Tb from a current sensor 51b mounted to an output terminal of the battery 50, and a battery temperature Tb from a temperature sensor 51c mounted to the battery 50. The battery ECU 52 is connected with the HVECU 70 via the respective communication ports. The battery ECU 52 calculates a state of charge SOC, based on an integrated value of the battery current Tb input from the current sensor 51b. The state of charge SOC denotes a ratio of the capacity of electric power dischargeable from the battery 50 to the overall capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. The HVECU 70 obtains signals input from various sensors via the input port. The signals input into the HVECU 70 include, for example, an ignition signal from an ignition switch 80 and a shift position SP from a shift position sensor 82 configured to detect an operating position of a shift lever 81. The input signals further include, for example, an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, a vehicle speed V from a vehicle speed sensor 88, and an ambient temperature Tout from an ambient temperature sensor 89. The HVECU 70 is connected with the engine ECU 24, the motor ECU 40, and the battery ECU 52 via the respective communication ports as described above.

The hybrid vehicle of the embodiment having the above configuration sets a required driving power for the driveshaft 36 based on the accelerator position Acc and the vehicle speed V and performs operation control of the engine 22 and the motors MG1 and MG2 so as to output, a required power that meets the required driving power to the driveshaft 36. The hybrid vehicle has the following three modes (1) to (3) as the operation mode of the engine 22 and the motors MG1 and MG2:

(1) torque conversion drive mode: mode that performs operation control of the engine 22 so as to output a power corresponding the required power from the engine 22, while performing drive control of the motors MG1 and MG2 so as to cause all the power output from the engine 22 to be subjected to torque conversion by the planetary gear 30 and the motors MG1 and MG2 and thereby output the required power to the driveshaft 36;

(2) charge-discharge drive mode: mode that performs operation control of the engine 22 so as to output a power that meets the sum of the required power and electric power required for charging or discharging the battery 50, from the engine 22, while performing drive control of the motors MG1 and MG2 so as to cause all the power or part of the power output from the engine 22 to be subjected to torque conversion by the planetary gear 30 and the motors MG1 and MG2 accompanied with charging or discharging of the battery 50 and thereby output the required power to the driveshaft 36; and (3) motor drive mode: mode that performs drive control of the motor MG2 so as to output the required power to the driveshaft 36, while stopping the operation of the engine 22.

In the hybrid vehicle 20 of the embodiment, the engine ECU 24 performs intake air amount control, fuel injection control, and controls of the feed pump 62 and the high-pressure fuel pump 65 of the fuel supply device 60 in the course of operation of the engine 22.

The intake air amount control first sets a target air flow Qa*, based on a target torque Te*. The intake air amount control subsequently sets a target throttle position TH* to make the intake air amount Qa reach the target air flow Qa*. The intake air amount control then controls the throttle motor 136 to make the throttle position TH reach the target throttle position TH*.

The fuel injection control first sets an active injection mode among the port injection mode, the in-cylinder injection mode and the shared injection mode, based on the rotation speed Ne and the volume efficiency KL of the engine 22. The fuel injection control subsequently sets a target injection amount Qfp* of the port injection valve 125 and a target injection amount Qfd* of the in-cylinder injection valve 126 to make the air fuel ratio AF reach a target air fuel ratio AF* (for example, stoichiometric air fuel ratio), based on the target air flow Qa* and the active injection mode. The fuel injection control then sets a target injection time τfp* of the port injection valve 125 and a target injection time τfd* of the in-cylinder injection valve 126, based on the target injection amounts Qfp* and Qfd* and the fuel pressures Pfp and Pfd. After setting the target injection times τfp* and τfd*, the fuel injection control controls the port injection valve 125 and the in-cylinder injection valve 126 to perform fuel injection for the target injection time τfp* from the port injection valve 125 and fuel injection for the target injection time τfd* from the in-cylinder injection valve 126.

The control of the feed pump 62 first sets a target discharge amount Qpp* of the feed pump 62, based on a target fuel pressure Pfp* of the fuel that is to be supplied to the port injection valve 125 and a total target injection amount Qfsum as a sum of the target injection amount Qfp* of the port injection valve 125 and the target injection amount Qfd* of the in-cylinder injection valve 126. A method of setting the target fuel pressure-Pfp* will be described later. According to the embodiment, the target discharge amount Qpp* is set to provide a larger value at the higher target fuel pressure Pfp* than a value at the lower target fuel pressure Pfp* and to provide a larger value at the larger total target injection amount Qfsum than a value at the smaller total target injection amount Qfsum. More specifically, the target discharge amount Qpp* is set to increase with an increase in the target fuel pressure Pfp* and to increase with an increase in the total target injection amount Qfsum. After the target discharge amount Qpp* is set in this manner, the feed pump 62 is controlled such that the discharge amount (fuel amount) from the feed pump 62 reaches the target discharge amount Qpp*.

The control of the high-pressure fuel pump 65 first sets a target discharge amount Qpd* of the high-pressure fuel pump 65, based on a target fuel pressure Pfd* of the fuel that is to be supplied to the in-cylinder injection valve 126 and the target injection amount Qfd* of the in-cylinder injection valve 126. The target fuel pressure Pfd* used may be, for example, several MPa to dozen MPa. According to the embodiment, the target discharge amount Qpd* is set to provide a larger value at the higher target fuel pressure Pfd* than a value at the lower target fuel pressure Pfd* and to provide a larger value at the larger target injection amount Qfd* than a value at the smaller target injection amount Qfd*. More specifically, the target discharge amount Qpd* is set to increase with an increase in the target fuel pressure Pfd* and to increase with an increase in the target injection amount Qfd*. After the target discharge amount Qpd* is set in this manner, the electromagnetic valve 65a of the high-pressure fuel pump 65 is controlled such that the discharge amount (fuel amount) from the nigh-pressure fuel pump 65 reaches the target discharge amount Qpd*.

Figure 3:
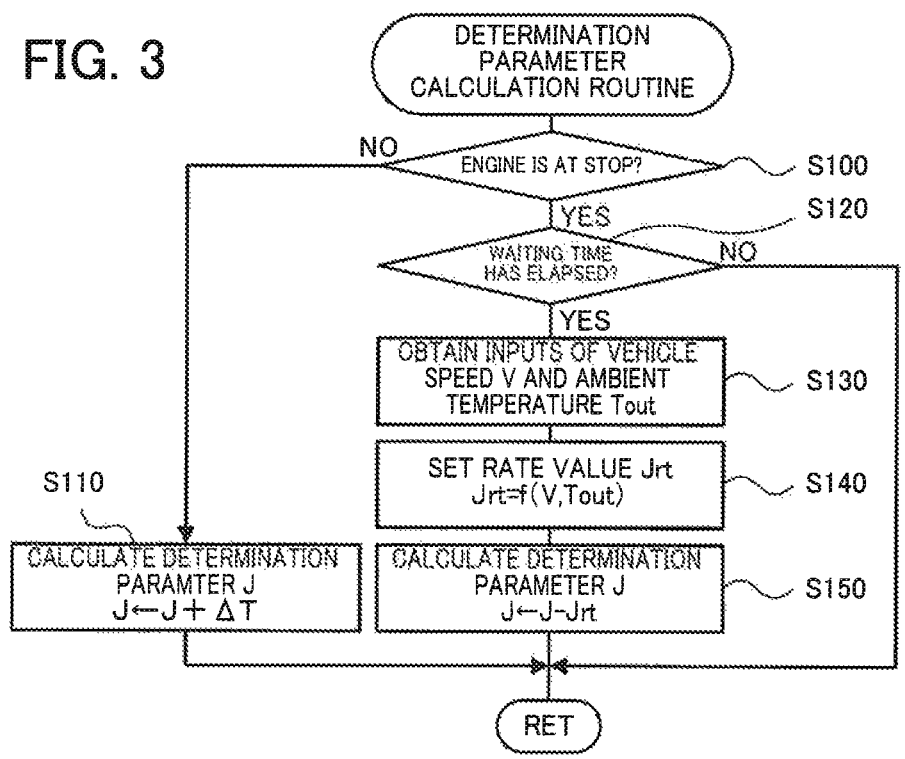
FIG. 3 is a flowchart showing one example of determination parameter calculation routine performed by HVECU.

The following describes operations of the hybrid vehicle 20 of the embodiment having the above configuration or more specifically series of operations to increment or decrement a determination parameter used in warm-up determination as a prerequisite determination of characteristic abnormality diagnosis of the fuel pressure sensor 69 that is placed, in the vicinity of the in-cylinder injection valve 126 in the high pressure-side passage 66. FIG. 3 is a flowchart showing one example of determination parameter calculation routine performed by the HVECU 70 according to the embodiment. This routine is repeatedly performed at predetermined time intervals (for example, every several tens msec) from an on operation to an off operation of the ignition switch 80.

When the determination parameter calculation routine is triggered, the HVECU 70 first determines whether the engine 22 is at stop (step S100). When it is determined that the engine 22 is in operation, the HVECU 70 increments a determination parameter J by a time period ΔT that denotes a time interval at which this routine is repeatedly performed (step S110) and then terminates this routine. The determination parameter J is incremented by the time period ΔT in every cycle of this routine when the engine 22 is in operation. This accordingly integrates the operation time of the engine 22.

When it is determined that the engine 22 is at stop, on the other hand, the HVECU 70 determines whether a waiting time has elapsed (step S120). The waiting time denotes a time period elapsed since a stop of operation of the engine 22. The waiting time will be described more later. When it is determined that the waiting time has not yet elapsed, the HVECU 70 terminates this routine.

Figure 4:
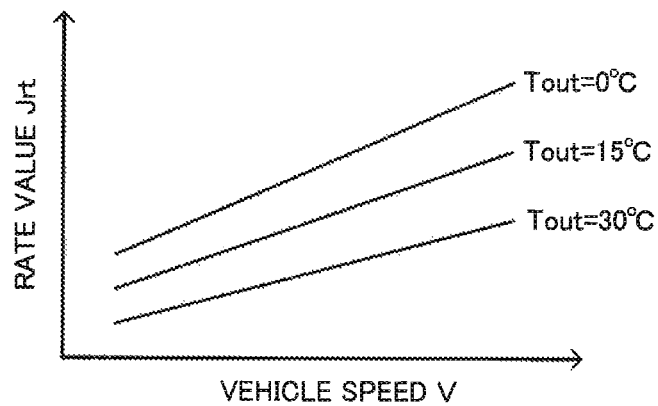
FIG. 4 shows one example of the relationship of a vehicle speed and an ambient temperature to a rate value.

When it is determined at step S120 that the waiting time has elapsed, the HVECU 70 obtains the inputs of the vehicle speed V from the vehicle speed sensor 88 and the ambient temperature Tout from the ambient temperature sensor 89 (step S130). The HVECU 70 subsequently sets a rate value Jrt, based on the input vehicle speed V and ambient temperature Tout (step S140), calculates a new value of the determination parameter J by subtracting the rate value Jrt from the current value of the determination parameter J (step S150) and terminates this routine. According to the embodiment, a relationship of the vehicle speed V and the ambient temperature Tout to the rate value Jrt is determined in advance and is stored as a rate value setting map. A corresponding rate value Jrt corresponding to a given vehicle speed V and a given ambient temperature Tout is read from the map to be set. FIG. 4 shows one example of the relationship of the vehicle speed V and the ambient temperature Tout to the rate value Jrt. According to the embodiment, the rate value Jrt is set to increase with an increase in the vehicle speed V and to increase with a decrease in the ambient temperature Tout. This is based on that an increase in the vehicle speed V increases the running wind and increases the degree of cooling the engine 22 and the high pressure-side passage 66 and that a decrease in the ambient temperature Tout increases the degree of cooling the engine 22 and the high pressure-side passage 66. Accordingly, when the engine 22 is at stop, the determination parameter J is decremented by the rate value Jrt that increases with an increase in the vehicle speed V and that increases with a decrease in the ambient temperature Tout.

As understood from the foregoing, the determination parameter J is incremented by the operation time of the engine 22 when the engine 22 is in operation, while being decremented by the rate value Jrt based on the vehicle speed V and the ambient temperature Tout after elapse of the waiting time since a stop of operation of the engine 22 when the engine 22 is at stop. Providing the waiting time aims not to start decrementing the determination parameter J immediately after a stop of operation of the engine 22 with a view to appropriately determining warm-up of the engine 22 and the high pressure-side passage 66, since the engine 22 and the high pressure-side passage 66 are slightly heated or kept warm by radiant heat of the engine 22 immediately after the stop of operation of the engine 22. According to the embodiment, the waiting time used is a predetermined time period (for example, 30 seconds or 1 minute) that is experimentally or otherwise determined.

Figure 5:
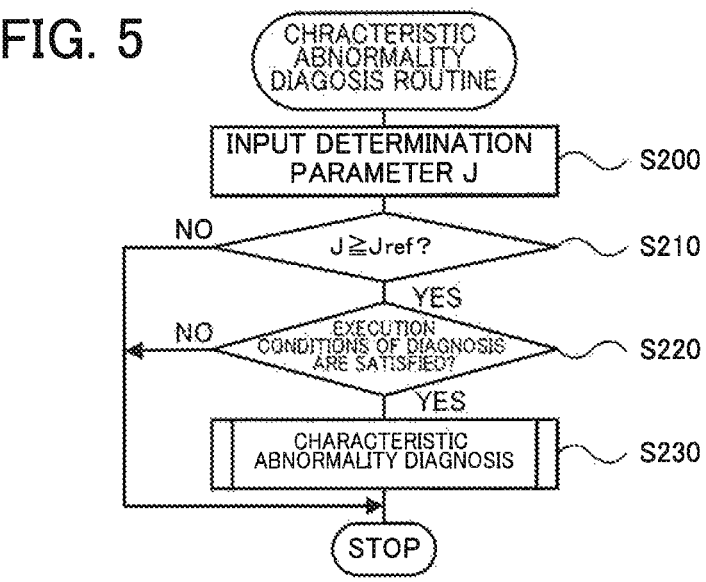
FIG. 5 is a flowchart showing one example of characteristic abnormality diagnosis routine performed by the HVECU.

The following describes series of operations to perform characteristic abnormality diagnosis of the fuel pressure sensor 69 when a predetermined time period (for example, five hours or six hours) has elapsed since an off operation of the ignition switch 80. FIG. 5 is a flowchart showing one example of characteristic abnormality diagnosis routine performed by the HVECU 70 when a predetermined time period has elapsed since an off operation of the ignition switch 80.

When the characteristic abnormality diagnosis routine is triggered, the HVECU 70 first obtains the input, of the determination parameter J when the ignition switch 80 is switched off (step S200) and subsequently determines whether the determination parameter J is equal to or larger than a reference value Jref (step S210). The reference value Jref denotes a criterion value used to determine whether the engine 22 and the high pressure-side passage 66 have been warmed up to a level that ensures appropriate characteristic abnormality diagnosis of the fuel pressure sensor 69 when the ignition switch 80 is switched off. The reference value Jref is experimentally or otherwise determined in advance. When it is determined that the determination parameter J is less than the reference value Jref, the HVECU 70 determines that the engine 22 and the high pressure-side passage 66 have not been warmed up to the level that ensures appropriate characteristic abnormality diagnosis of the fuel pressure sensor 69 and terminates this routine without performing characteristic abnormality diagnosis of the fuel pressure sensor 69.

When it is determined at step S210 that the determination parameter J is equal to or larger than the reference value Jref, on the other hand, the HVECU 70 determines whether execution conditions of the characteristic abnormality diagnosis of the fuel pressure sensor 69 are satisfied (step S220). The execution conditions of the characteristic abnormality diagnosis of the fuel pressure sensor 69 include, for example, a condition that the voltage Vb of the battery 50 is equal to or higher than a set voltage and a condition that an integrated value of intake air amount is equal to or larger than a predetermined value. When the execution conditions are not satisfied, the HVECU 70 terminates this routine without performing the characteristic abnormality diagnosis of the fuel pressure sensor 69. When the execution conditions are satisfied, on the other hand, the HVECU 70 performs the characteristic abnormality diagnosis of the fuel pressure sensor 69 (step S230) and then terminates this routine. The characteristic abnormality diagnosis of the fuel pressure sensor 69 includes, for example, a procedure of obtaining the input of the fuel pressure Pfd from the fuel pressure sensor 69 and determining whether the input fuel pressure Pfd is in a predetermined pressure range (range between a reference value Pref1 and a reference value Pref2).

Figure 6:
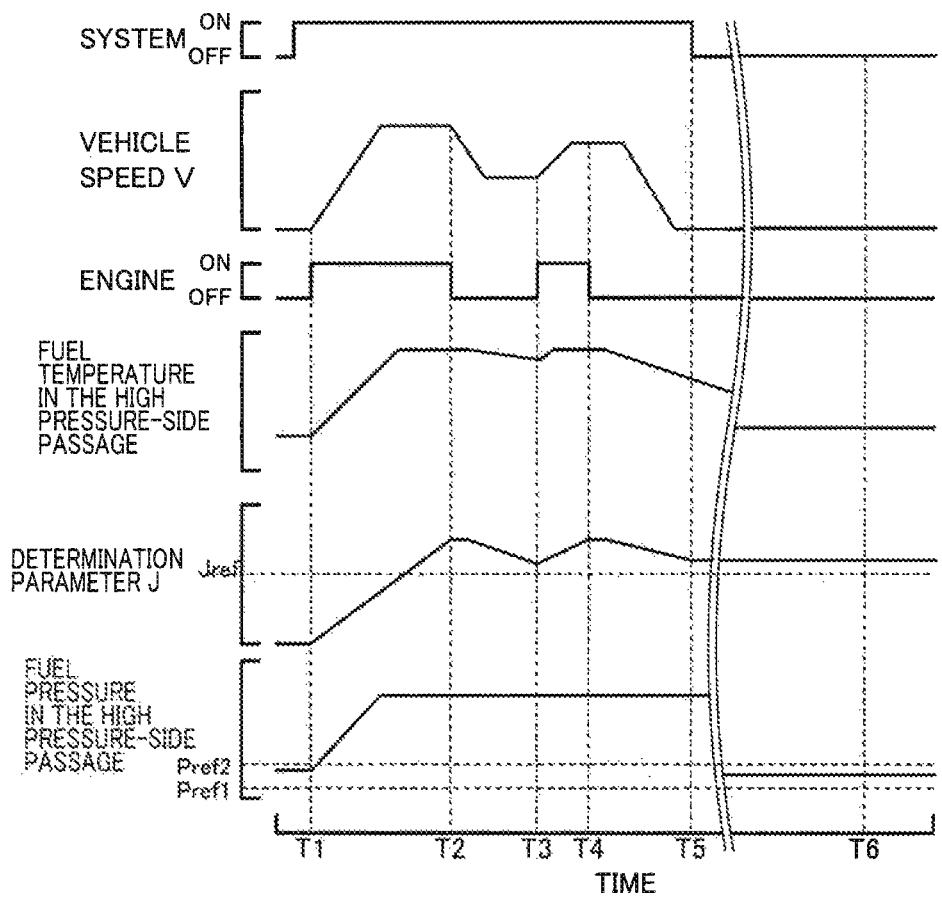
FIG. 6 is a diagram showing one example of time changes of the vehicle speed, a fuel temperature in the high pressure-side passage, a determination parameter, and a fuel pressure of the high pressure-side passage during intermittent operation of the engine.

FIG. 6 is a diagram showing one example of time changes of the vehicle speed V, the fuel temperature in the high pressure-side passage 66, the determination parameter J, and the fuel pressure Pfd of the high pressure-side passage 66 during intermittent operation of the engine 22. At a time T1 when the accelerator pedal 83 is depressed after the ignition switch 80 is switched on to turn on the system, the engine 22 starts operation and the vehicle speed V then starts increasing. When the engine 22 is operated, the fuel temperature in the high pressure-side passage 66 increases with an increase in the temperature of the engine 22. The determination parameter J is equivalent to an integrated value of operation time of the engine 22 during operation of the engine 22 and increases monotonously. The fuel pressure Pfd of the high pressure-side passage 66 is increased to a predetermined pressure by operation of the engine 22 and is kept at the predetermined pressure. After a time T2 when the engine 22 stops operation, the fuel temperature in the high pressure-side passage 66 is kept at the increased temperature for some time period and then slowly decreases. The determination parameter J is kept at the increased value until elapse of the waiting time and is then decremented by the rate value Jrt according to the vehicle speed V and the ambient temperature Tout. After a time T3 when the accelerator pedal 83 is depressed to start the engine 22, the fuel temperature in the high pressure-side passage 66 increases with operation of the engine 22, and the determination parameter J is incremented with elapse of the operation time of the engine 22. For a time period from a time T4 when the engine 22 stops operation to a time T5 when the ignition switch 80 is switched off to turn off the system, the fuel temperature in the high pressure-side passage 66 is kept at the increased temperature for some time period and then slowly decreases. The determination parameter J is kept at the increased value until elapse of the waiting time and is then decremented by the rate value Jrt according to the vehicle speed V and the ambient temperature Tout. After the time T5 when the system is turned off, the fuel temperature in the high pressure-side passage 66 slowly decreases, the determination parameter J is kept at the value when the system is turned off, and the fuel pressure Pfd of the high pressure-side passage 66 gradually decreases. At a time T6 when a predetermined time period (for example, five hours or six hours) has elapsed since the system-off time, the characteristic abnormality diagnosis routine of FIG. 5 is triggered. When the determination parameter J is equal to or larger than the reference value Jref and the execution conditions of the characteristic abnormality diagnosis are satisfied, the characteristic abnormality diagnosis of the fuel pressure sensor 69 is performed (for example, to determine whether the fuel pressure Pfd is in the range between the reference value Pref1 and the reference value Pref2).

As described above, the hybrid vehicle of the embodiment determines whether the determination parameter J is equal to or larger than the reference value Jref, in order to determine whether the engine 22 and the high pressure-side passage 66 have been warmed up to the level that ensures appropriate characteristic abnormality diagnosis of the fuel pressure sensor 69. The determination parameter J is basically incremented by the operation time of the engine 22 when the engine 22 is in operation, while being decremented by the rate value Jrt according to the vehicle speed V and the ambient temperature Tout when the engine 22 is at stop. This configuration allows for more appropriate determination of whether the degree of warm-up of the engine 22 and the high pressure-side passage 66 at the system-off time reaches the level that ensures appropriate characteristic abnormality diagnosis of the fuel pressure sensor 69 that is performed after elapse of the predetermined time period. Additionally, the determination parameter J is not decremented until elapse of the waiting time since a stop of operation of the engine 22. This enables the degree of warm-up of the engine 22 and the high pressure-side passage 66 at the system-off time to be more appropriately reflected on the determination parameter J.

Figure 7:
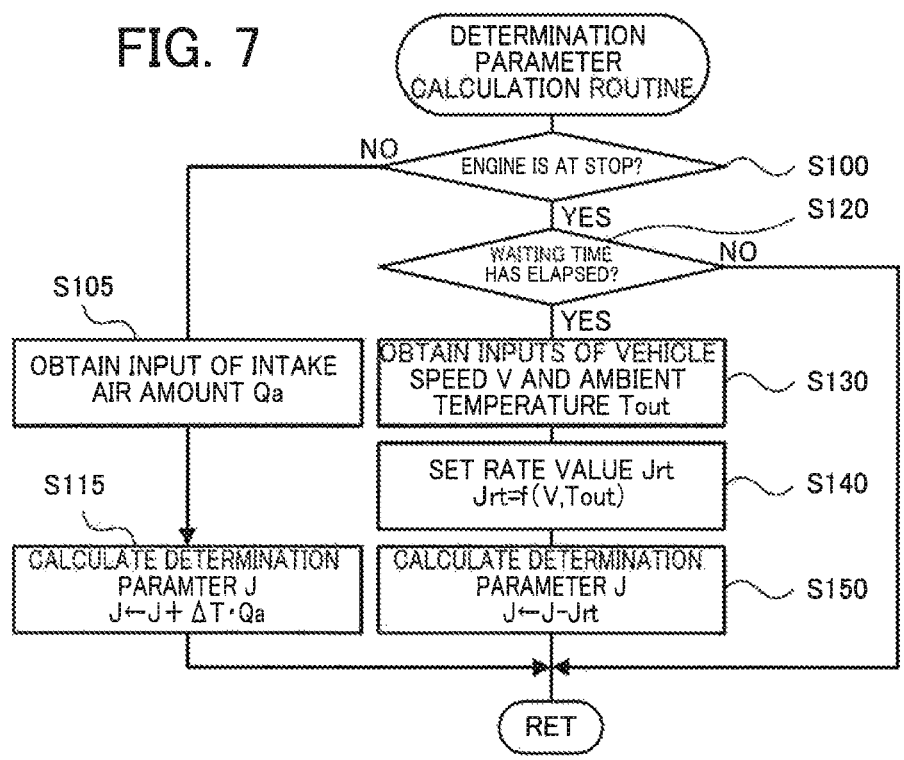
FIG. 7 is a flowchart showing one example of determination parameter calculation routine according to a modification.

In the hybrid vehicle 20 of the embodiment, the determination parameter J is basically incremented by the operation time of the engine 22 when the engine 22 is in operation, while being decremented by the rate value Jrt according to the vehicle speed V and the ambient temperature Tout when the engine 22 is at stop. According to a modification, the determination parameter J may be incremented by an integrated value of the intake air amount when the engine 22 is in operation, while being decremented by the rate value Jrt according to the vehicle speed V and the ambient temperature Tout when the engine 22 is at stop. In this modification, a determination parameter calculation routine of FIG. 7 may be performed instead of the determination parameter calculation routine of FIG. 3. The routine of FIG. 7 when, it is determined, at step S100 that the engine 22 is at stop is similar to the routine of FIG. 3, except that the rate value Jrt set according to the vehicle speed V and the ambient temperature Tout is applied to integration of the intake air amount Qa, in place of integration of the operation time of the engine 22. The detailed description of the processing flow when it is determined at step S100 that the engine 22 is at stop is omitted, in order to avoid, duplicated explanation. When it is determined at step S100 that the engine 22 is in operation, the HVECU 70 obtains the input of the intake air amount Qa from the air flowmeter 148 (step S105), increments the determination parameter J by the product of the input intake air amount. Qa and a time period ΔT that denotes a time period at which this routine is repeatedly performed (step S115) and then terminates this routine. The determination parameter J is accordingly incremented by integration of the intake air amount Qa when the engine 22 is in operation. The integrated value of the intake air amount. Qa reflects the degree of operation of the engine 22 in addition to the operation time of the engine 22. Accordingly, the determination parameter J reflects the degree of warm-up of the engine 22 and the high pressure-side passage 66. As a result, the configuration that the determination parameter J is incremented by the integrated value of the intake air amount when the engine 22 is in operation has similar advantageous effects to those of the embodiment described above.

Figure 8:
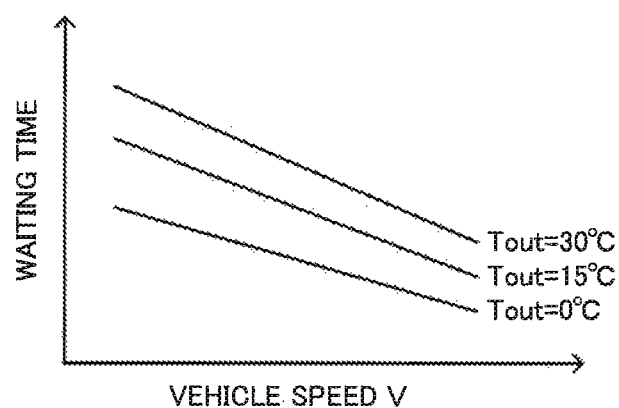
FIG. 8 shows one example of the relationship of the vehicle speed and the ambient temperature to a waiting time.

In the hybrid vehicle 20 of the embodiment, the predetermined time that is experimentally or otherwise determined is used as the waiting time until decrement of the determination parameter J is started after a stop of operation of the engine 22. According to a modification, the waiting time may be set based on the vehicle speed V and the ambient temperature. Tout, since the time period when the engine 22 and the high pressure-side passage 66 are heated or kept warm by radiant heat of the engine 22 immediately after a stop of operation of the engine 22 is affected by the vehicle speed V and the ambient temperature Tout. For example, a relationship of the vehicle speed V and the ambient temperature Tout to the waiting time may be experimentally or otherwise determined in advance and stored as a waiting time setting map. A corresponding waiting time corresponding to a given vehicle-speed V and a given ambient temperature Tout may be read from the map to be set. FIG. 8 shows one example of the relationship of the vehicle speed V and the ambient, temperature Tout to the waiting time. In this modification, the waiting time is set to decrease with an increase in the vehicle speed V and to decrease with a decrease in the ambient temperature Tout. This is based on that an increase in the vehicle speed V increases the running wind and increases the degree of cooling the engine 22 and the high pressure-side passage 66 and that a decrease in the ambient temperature Tout increases the degree of cooling the engine 22 and the high pressure-side passage 66.

Figure 9:
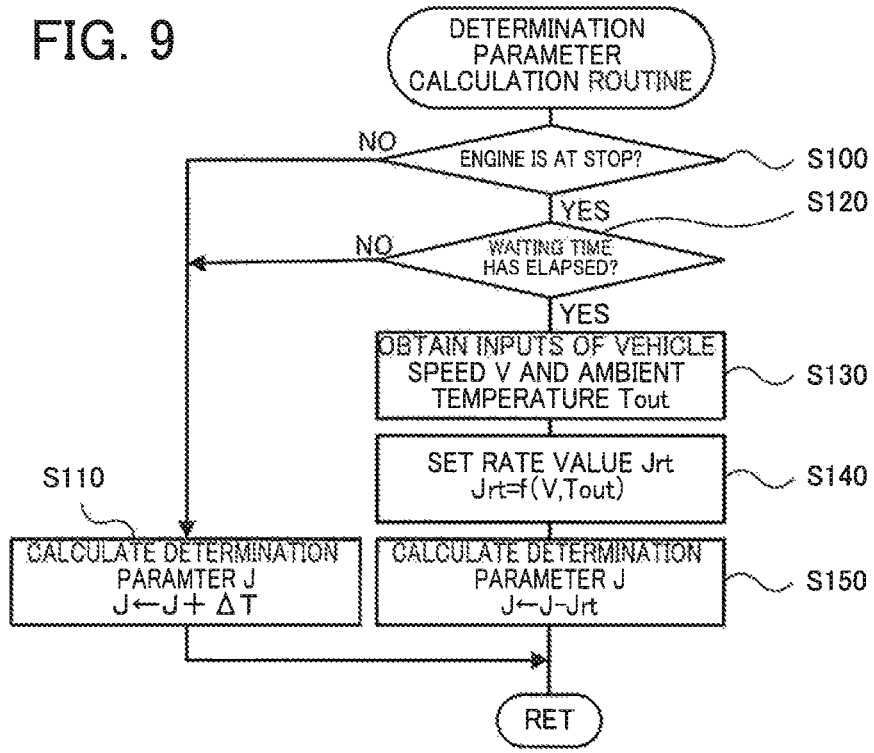
FIG. 9 is a flowchart showing one example of determination parameter calculation routine according to another modification.

In the hybrid vehicle of the embodiment, the determination parameter J is kept until elapse of the waiting time since a stop of operation of the engine 22 and is then decremented by the rate value Jrt. According to a modification, the determination parameter J may be incremented until elapse of the waiting time since a stop of operation of the engine 22. In this modification, a determination parameter calculation routine of FIG. 9 may be performed instead of the determination parameter calculation routine of FIG. 3. In the routine of FIG. 9, the processing flow when it is determined at step S100 that the engine 22 is in operation and the processing flow when it is determined at step S120 that the waiting time has elapsed are identical with those in the routine of FIG. 3. The detailed description of the processing flow when it is determined at step S100 that the engine 22 is in operation and the processing flow when it is determined at step S120 that the waiting time has elapsed are omitted, in order to avoid duplicated explanation. When it is determined at step S120 that the waiting time has not yet elapsed, the HVECU 70 increments the determination parameter J by a time period ΔT that denotes a time interval at which this routine is repeatedly performed (step S110) and then terminates this routine. Accordingly, the determination parameter J is incremented by integration of the operation time of the engine 22 until the waiting time has elapsed since a stop of operation of the engine 22, like the processing flow when the engine 22 is in operation. This configuration enables the phenomenon that the engine 22 and the high pressure-side passage 66 are heated or kept warm by radiant heat of the engine 22 immediately after a stop of operation of the engine 22 to be reflected on the determination parameter J.

Figure 10:
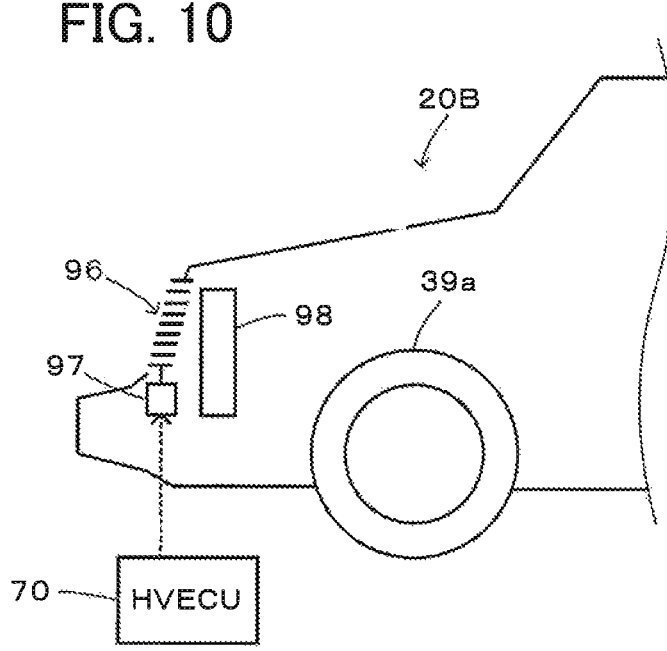
FIG. 10 is a configuration diagram illustrating a part of the schematic configuration of a hybrid vehicle according to a modification.
Figure 11:
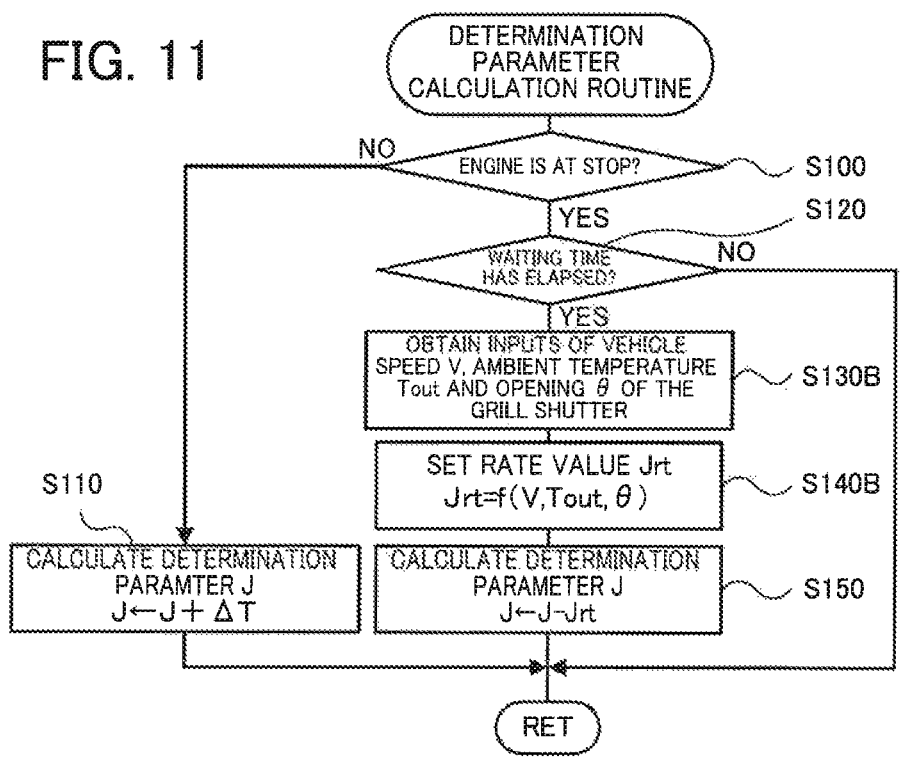
FIG. 11 is a flowchart showing one example of determination parameter calculation routine according to another modification.
Figure 12:
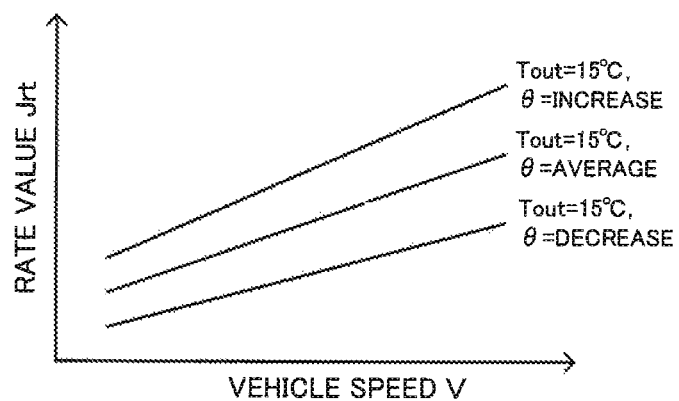
FIG. 12 shows one example of a relationship of the vehicle speed, the ambient temperature and an opening of the grill shutter to the rate value.

In the hybrid vehicle 20 of the embodiment, the determination parameter J is basically incremented by the operation time of the engine 22 when the engine 22 is in operation, while being decremented by the rate value Jrt according to the vehicle speed V and the ambient temperature Tout when the engine 22 is at stop. In a configuration that a grill shutter 96 that is driven to be opened and closed by an actuator 97 is attached to a grill in front of a radiator 98 as in a hybrid vehicle 20B of a modification shown in FIG. 10, the rate value Jrt may be set according to an opening of the grill shutter 96, as well as the vehicle speed V and the ambient temperature Tout. The hybrid vehicle 20B of the modification is provided with the grill shutter 96 having its opening θ adjustable by the actuator 97, but otherwise has a similar configuration to that of the hybrid vehicle of the embodiment shown in FIG. 1. The actuator 97 of the grill shutter 96 is driven by a drive control signal from the HVECU 70. The hybrid vehicle 20B of the modification performs a determination parameter calculation routine of FIG. 11 instead of the determination parameter calculation routine of FIG. 3. In the routine of FIG. 11, the processing flow when it is determined at step S100 that the engine 22 is in operation and the processing flow when it is determined, at step S120 that the waiting time has not yet elapsed are identical with those in the routine of FIG. 3. The detailed description of the processing flow when it is determined at step S100 that the engine 22 is in operation and the processing flow when it is determined at step S120 that the waiting time has not yet elapsed are omitted, in order to avoid duplicated explanation. When it is determined at step S120 that the waiting time has elapsed, the HVECU 70 obtains the inputs of the vehicle speed V from the vehicle speed sensor 88, the ambient temperature Tout from the ambient temperature sensor 89 and the opening θ of the grill shutter 96 (step S130B). According- to the modification, the input opening θ of the grill shutter 96 is calculated based on the drive control signal given to the actuator 97. The HVECU 70 subsequently sets the rate value Jrt, based on the vehicle speed V, the ambient temperature Tout, and the opening θ of the grill shutter 96 (step S140B), calculates a new value of the determination parameter J by subtracting the set rate value Jrt from the current value of the determination parameter J (step S150) and then terminates this routine. According to the modification, a relationship of the vehicle speed V, the ambient temperature Tout and the opening θ of the grill shutter 96 to the rate value Jrt is determined in advance and is stored as a rate value setting map. A corresponding rate value Jrt corresponding to a given vehicle speed V, a given ambient temperature Tout and a given opening θ of the grill shutter 96 is read from the map to be set. FIG. 12 shows one example of the relationship of the vehicle speed V, the ambient temperature Tout and the opening θ of the grill shutter 96 to the rate value Jrt. According to the modification, the rate value Jrt is set to increase with an increase in the vehicle speed V, to increase with a decrease in the ambient temperature Tout and to decrease with a decrease in the opening θ of the grill shutter 96. This is based on that an increase in the vehicle speed V increases the running wind and increases the degree of cooling the engine 22 and the high pressure-side passage 66, that a decrease in the ambient temperature Tout increases the degree of cooling the engine 22 and the high pressure-side passage 66, and that an increase in the opening θ of the grill shutter 96 increases the volume of the running wind supplied to the engine 22 and the high pressure-side passage 66.

In the configuration of the embodiment, the engine 22 and the motor MG1 are connected via the planetary gear 30 with the driveshaft 36 that is coupled with the drive wheels 39a and 39b, and the motor MG2 is connected with the driveshaft 36. The present disclosure may also be applied to the configuration of a one-motor hybrid vehicle that a motor is connected via a transmission with a driveshaft coupled with drive wheels and that an engine is connected via a clutch with a rotating shaft of the motor. The present disclosure may be applied to the configuration of a series hybrid vehicle that a driving motor is connected with a driveshaft coupled with drive wheels and that a power generation motor configured to transmit electric power to and from the driving motor is connected with an output shaft of an engine. The present disclosure may further be applied to the configuration of an automobile that is not equipped with a motor and is driven with only the power from an engine.

In the motor vehicle of this aspect, the control device may increment the warm-up determination parameter until satisfaction of the predetermined condition even when the engine is not in operation. The engine and the supply flow path of the fuel are affected by radiant heat of the engine for some time period after a stop of the engine. Incrementing the warm-up determination parameter in this time period enables the temperature of the engine and the temperature of the supply flow path of the fuel to be more appropriately reflected on the warm-up determination parameter. As a result, this configuration ensures the more appropriate characteristic abnormality diagnosis of the fuel pressure sensor. According to a modification, the warm-up determination parameter may be kept unchanged without incrementing or decrementing until satisfaction of the predetermined condition even when the engine is not in operation.

The motor vehicle of this aspect, may further includes a grill shutter of an adjustable opening provided in front of the engine, and the warm-up determination parameter may be decremented by a decrement value that increases with an increase in opening of the grill shutter. This is based on that the effect of the running wind differs by the opening of the grill shutter. Accordingly, this configuration enables the temperature of the engine and the temperature of the supply flow path of the fuel to be more appropriately reflected on the warm-up determination parameter. As a result, this configuration ensures the more appropriate characteristic abnormality diagnosis of the fuel pressure sensor.

The following describes the correspondence relationship between the primary components of the embodiment and the primary components of the disclosure described in Summary. The in-cylinder injection valve 126 of the embodiment corresponds to the "in-cylinder injection valve" and the engine 22 corresponds to the "engine". The high pressure-side passage 66 corresponds to the "supply flow path", the high-pressure fuel pump 65 corresponds to the "high-pressure fuel pump", the fuel supply device 60 corresponds to the "fuel supply device", the fuel pressure sensor 69 corresponds to the "fuel pressure sensor", and the HVECU 70 corresponds to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the motor vehicle and so on.

The invention claimed is:

1. A motor vehicle, comprising:
an engine including an in-cylinder injection valve configured to inject, a fuel in a cylinder;
a fuel supply device including a high-pressure fuel pump configured to pressurize the fuel from a fuel tank and supply the pressurized fuel to a supply flow path that is connected with the in-cylinder injection valve;
a fuel pressure sensor configured to detect a pressure of the fuel in the supply flow path; and
a control device configured to control the engine and the fuel supply device and to perform characteristic abnormality diagnosis that determines whether a characteristic abnormality occurs in the fuel pressure sensor, on satisfaction of abnormality diagnosis prerequisites that include a condition that a warm-up determination parameter indicating a degree of warm-up of the engine at a system-off time is equal to or greater than a predetermined value, after a system-off state has continued for a preset time period since a system-off operation, wherein
for a time period from a system-on operation to a system-off operation, the control device increments the warm-up determination parameter when the engine is in operation, while decrementing the warm-up determination parameter after satisfaction of a predetermined condition when the engine is not in operation.

2. The motor vehicle according to claim 1,
wherein the warm-up determination parameter is either a parameter based on integration of an operation time of the engine or a parameter based on integration of an intake air amount of the engine.

3. The motor vehicle according to claim 1,
wherein the warm-up determination parameter is decremented by a decrement value that increases with a decrease in ambient temperature and/or increases with an increase in vehicle speed.

4. The motor vehicle according to claim 1,
wherein the predetermined condition is a condition that a predetermined time period has elapsed since a stop of the engine.

5. The motor vehicle according to claim 4,
wherein the predetermined time period is a time period that, decreases with a decrease in ambient temperature or a time period that decreases with an increase in vehicle speed.

6. The motor vehicle according to claim 1,
wherein the control device increments the warm-up determination parameter until satisfaction of the predetermined condition even when the engine is not in operation.

7. The motor vehicle according to claim 1, further comprising:
a grill shutter of an adjustable opening provided in front of the engine, wherein
the warm-up determination parameter is decremented by a decrement value that increases with an increase in opening of the grill shutter.

* * * * *